United States Patent [19]

Jackson

[11] 4,176,258
[45] Nov. 27, 1979

[54] METHOD AND CIRCUIT FOR CHECKING INTEGRATED CIRCUIT CHIPS

[75] Inventor: Daniel K. Jackson, Hillsboro, Oreg.

[73] Assignee: INTEL Corporation, Santa Clara, Calif.

[21] Appl. No.: 901,527

[22] Filed: May 1, 1978

[51] Int. Cl.$^2$ .............................................. G01R 31/28
[52] U.S. Cl. .................... 235/302; 324/73 R
[58] Field of Search ............ 235/302, 307; 324/73 R, 324/73 PC; 364/900; 365/200, 201

[56] References Cited

U.S. PATENT DOCUMENTS

| | | | |
|---|---|---|---|
| 3,636,443 | 1/1972 | Singh et al. | 235/302 |
| 3,815,025 | 6/1974 | Jordan | 235/302 |
| 3,913,072 | 10/1975 | Catt | 365/200 |
| 4,038,648 | 7/1977 | Chesley | 324/73 R |

OTHER PUBLICATIONS

Barnard & McMahon, Shift Register Tester on a Chip, IBM Technical Disclosure Bulletin, vol. 15, No. 9, Feb. 1973, pp. 2936-2956.
Leininger, On-Chip Enhancement of a Single-Chip Microprocessor, IBM Technical Disclosure Bulletin, vol. 21, No. 1, Jun. 1978, pp. 5 & 6.

*Primary Examiner*—Charles E. Atkinson

*Attorney, Agent, or Firm*—Owen L. Lamb

[57] ABSTRACT

Method and circuit for checking integrated circuit chips without the use of external checking circuits. Chips are fabricated with an error-checking circuit on each chip. Data from data processing logic on each chip is outputted via a first path to one input of its respective checking circuit and via a second path to an output pin or pins. The output pin on each chip is also connected via a third path to the other input of its checking circuit. The input and output pins of each chip are wired in parallel. A separate check input pin is provided to each integrated circuit chip. On one chip this pin is activated, making this first chip the checker. On the other chip, the check input pin is deactivated. On the chip which is the checker, the output from the data processing logic is prevented from being passed externally via the first path, but is allowed to enter the checking circuit via the second path. The output from the other chip, which is wired in parallel with the first chip, enters the error-checking circuit on the first chip via the third path. The outputs from the first chip and the second chip are thus checked with respect to each other in the error-checking circuit, and if they do not check properly an error output is generated, indicating that one of the data processing logic circuits is faulty.

10 Claims, 2 Drawing Figures

METHOD AND CIRCUIT FOR CHECKING INTEGRATED CIRCUIT CHIPS

BACKGROUND OF THE INVENTION

1. Field of the Invention

This invention relates to integrated logic circuits and more particularly, to a method and circuit for checking integrated circuit chips.

2. Description of Prior Art

Redundant checking systems are well known in prior art. For example, in the past, two identical logic circuits have been wired in parallel, the same input information being supplied to each, with the output of each circuit being compared in a comparison checking circuit for equality. For example, two identical computers have been operated side-by-side with the same problem being supplied to each. A comparison of the results from each computer at some point in the computation indicates whether one of the computers has malfunctioned.

Because of the high cost of duplicating logic in the past, this type of redundancy checking has been mainly limited to military applications or applications in the space program wherein back-up computers are necessary.

Checking using redundant logic is an attractive technique and it is desirable to have some inexpensive way of checking duplicate circuits without requiring expensive error-checking circuitry. It is particularly desirable to extend the principle of redundant logic checking to modern integrated circuit technology wherein the circuits being so complex, it is becoming increasingly difficult to check their operation.

It is, therefore, a principal object of the present invention to provide an inexpensive redundant logic checking method particularly suited to integrated circuit technology.

It is a further object of this invention to provide an error-checking circuit for use with integrated circuit chips which does not require an additional part number or chip for the error-checking function.

Briefly, the method of checking integrated circuit chips, in accordance with the present invention, is as follows:

An error-checking logic circuit is fabricated on each of a number of chips. Data from data processing logic on each chip is outputted via a first path to one input of its respective error circuit. The data is also outputted via a second path to an output pin or pins on the chip. The inputs of the chips are externally wired in parallel, and since the chips receive the same input data, they should each generate the same output at any instant of time. The second path to the output pin or pins of all but one of said chips is inhibited by energizing a check input of a pin dedicated to this purpose, so that its output data does not reach its output pin or pins. The output pin or pins of the chip is connected internally via a third path to the other input of the error circuit. In this manner data generated internally on all but one of the chips via the first path is checked against data generated and passed externally from the other chip via the third path. The error-checking circuit on the chip which has its outputs enabled compares its internal data against the data present on the output pin or pins, thereby checking its own output drivers.

The invention has the advantage that when operating properly, both chips should be in exactly the same state throughout all time and therefore the outputs should agree.

In accordance with an aspect of the invention, three-state drivers may be provided such that the output drivers of the chip(s) activated to be a checker (or multiple checkers) are put into a high-impedance state so that no off-chip outputs are generated.

BRIEF DESCRIPTION OF THE DRAWINGS

The foregoing and other objects, features, and advantages of the invention, will be apparent from the following detailed description of preferred embodiments of the invention as illustrated in the accompanying drawings wherein.

DESCRIPTION

Figure 1:
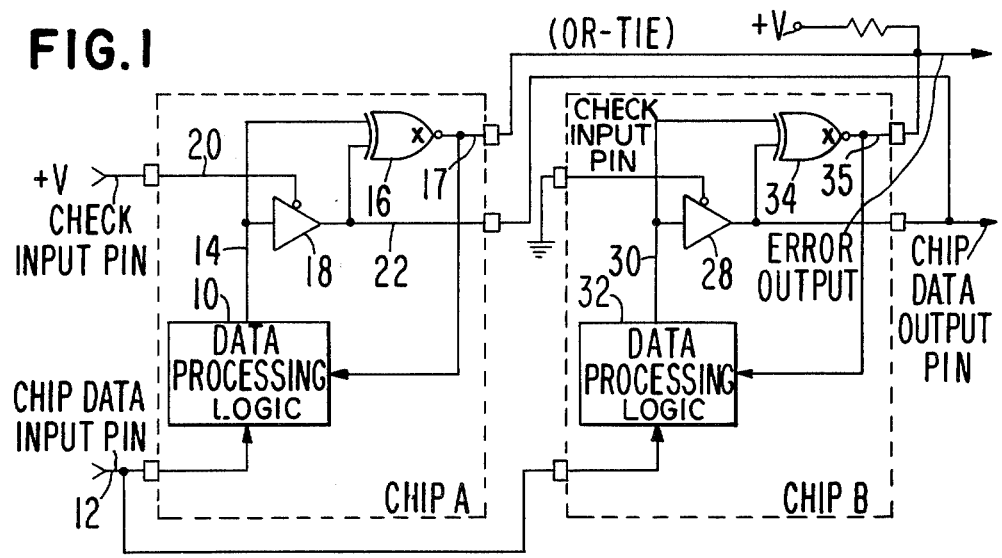
FIG. 1 is a block schematic diagram of two integrated circuit chips wired in parallel, in accordance with the present invention.

Referring now to FIG. 1, two integrated circuit chips, Chip A, and Chip B, are shown within the dotted lines. Both chips may be manufactured identically and therefore may have the same part number. Each chip has fabricated thereon data processing logic 10 which may be any integrated circuit which will respond to an input 12 and provide an output 14 which bears some predetermined relationship to the input depending upon the function preferred by the logic 10. The logic may be simple such as dyadic boolean operators, or it may be complex, such as a complete microprocessor. An error-checking circuit 16 is fabricated on the chip and may be, for example, and exclusive NOR. It is not intended that the invention be limited to comparison checking. The principles are the same regardless of the type of checking operation performed. The output 14 of the data processing logic 10 is supplied directly to one input of the exclusive NOR 16 and to the input of a three-state driver 18. The three-state driver 18 has an enable input 20 which is connected to a check-input pin on the integrated circuit package. The output 22 of the driver is connected to an external chip data output pin and is connected to the other side of the comparison circuit 16. When the check-input pin is energized, the driver 18 is disabled so that no data passes there through. The driver 18 may be any multi-state device either totally self-contained on the chip such as a latch, a simple switch or a blowable link or partially relying on an external signal, such as a check pin with its associated on-chip support logic.

Chip B is similar to Chip A. On Chip B the check-input pin is tied to ground so that the driver 28 on Chip B is energized to a low impedance state allowing the data output 30 to pass therethrough to the chip data output pin of Chip B. All of the pins of Chip A and Chip B, with the exception of the check-input pins, are wired in parallel. The chip data input 12 is supplied to both data processing logic circuit 10 on Chip A and 32 on Chip B. Therefore, both chips receive the same input data and should generate the same outputs 14, and 30, if both logics are functioning properly. The output of data processing logic 32 passes through the driver 28 to the chip data output. Since the chip data outputs of both chips are wired in parallel, this data is supplied as an input to the exclusive OR ciruit 16 on Chip A. This data is also supplied to the exclusive NOR circuit 34 on Chip B. However, since the same data on line 30 are applied to the other leg of this exclusive OR circuit, no output from the exclusive NOR results (unless there is a malfunction in the driver circuit 28).

The output of data processing logic 10 does not pass through the driver 18 on Chip A because this driver is energized to a high impedance state by the positive voltage (+V) on the check input pin. However, the output 14 is supplied to one leg of the exclusive NOR 16 where it is compared with the output from the data processing logic 32 of Chip B. If there is a malfunction on either Chip A or Chip B an inequality will occur in exclusive NOR 16 which will generate an output 17 over the error output line.

The error output on each chip is fed back internally to the data processing logic, in order to inform the logic that an error has occurred, so that an appropriate response can be taken.

The error output may be implemented as a low asserted only type of OR-tied line, with passive pull-up to allow any one of several chips to be able to signal an error, possibly simultaneously.

To summarize, integrated circuit chips are manufactured with error-checking circuitry present on each chip. The inputs to the chips are wired in parallel. A check input pin is provided on each chip. On all but one chip this input is energized to activate the checking circuitry. On the one remaining chip the input is not energized and therefore its output is not disabled. Thus, all but one chip become checkers and internally compare the output of their own logics with the output received in from the logic of the remaining logic. If the outputs of the chips do not compare, an error signal is generated to indicate this fact. It should be understood that three or more chips may be wired in parallel, and a reconfiguration technique can be utilized to bypass a faulty chip and substitute standby logic to replace the faulty chip.

Figure 2:
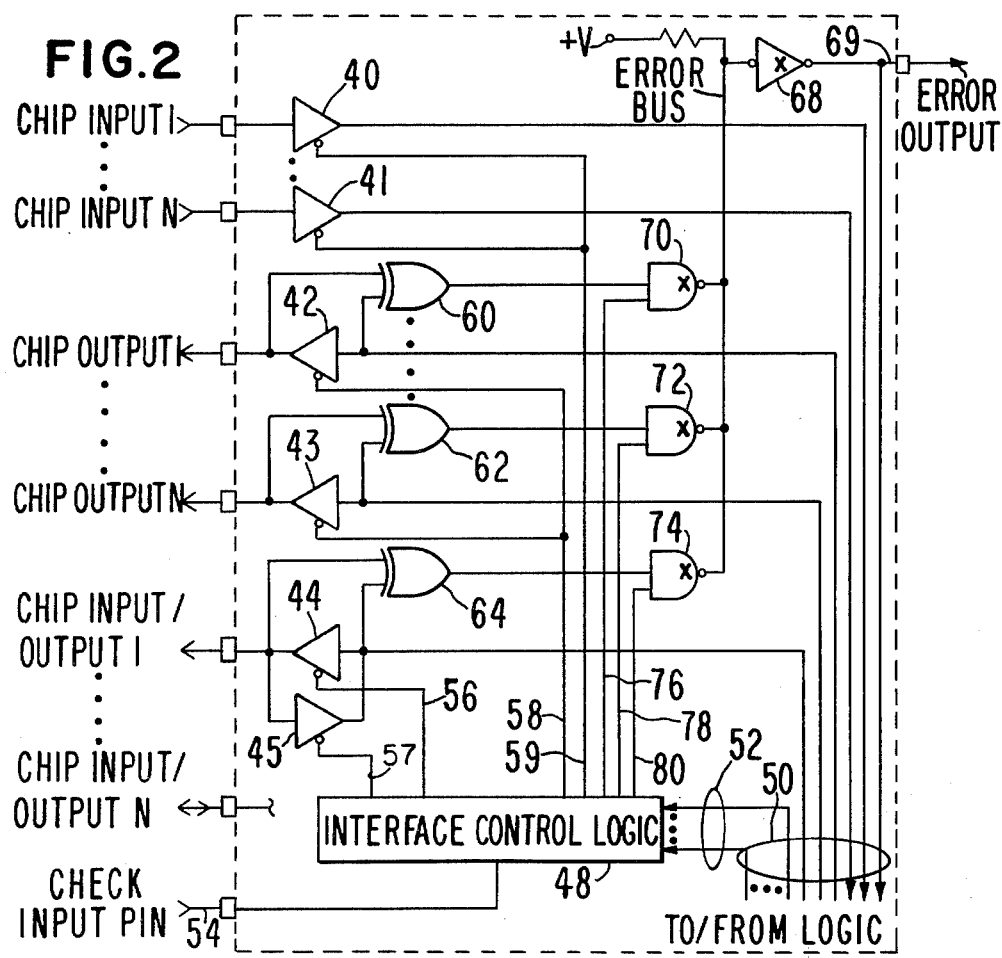
FIG. 2 is a block schematic diagram of error-checking circuits and interface control logic on an integrated circuit chip constructed in accordance with the teachings of the present invention.

The invention is easily adapted to more complex integrated circuits. A circuit chip having multiple inputs, multiple outputs, and bidirectional input/output pins is shown in FIG. 2. A number of input and output interfacing drivers 40-45 are provided on all input and output lines. An interface control logic 48 is provided to energize the input/output drivers. Data and control information from the on-chip logic is carried by means of bus 50 to and from the input/output drivers. Control lines 52 are provided to the interface control logic to energize appropriate control lines for gating the information into and out of the chip. A check-input 54 is provided to the interface control logic. When this line is energized all output drivers 42, 43, 44, are disabled. This is accomplished by placing a signal on interface logic control lines 56 and 58. This causes the drivers 40, 43 and 44 to go to a high-impedance state, thus preventing any outputs from the chip. The gating of the inputs still remains under the control of the on-chip control logic by means of line 59.

The comparators 60, 62, 64 perform the same function as the comparators described with respect to FIG. 1. The outputs of these comparators feed NAND circuits 70, 72, 74 which by means of open collector connections are dot ORed together over the error bus to a driver 68. (It should be understood that a multiple input NAND gate could be used in place of the open collector type wire OR-ed function.) This provides an error output should any one of the exclusive NORs register a mismatch. The NAND circuits 70, 72, 74, are controlled by lines 76, 78, 80, from control logic 48 in order to ensure that error indications are gated to the error output only when such indications are valid with respect to the operation of the on-chip logic. The error line 69 is fed back internally to the on-chip logic so that it can make appropriate response to an error.

When the chip shown in FIG. 2 is wired in parallel with another chip or chips in a manner similar to that described with respect to FIG. 1, the comparison checking can take place. The check input pin on one chip would be activated while the same pin would be deactivated on the other chip. Thus, the first chip becomes the checker and compares the output of its own logic with the output of the logic on the other chip. If the outputs from the two chips do not compare, an error signal is generated in a manner similar to that described with respect to FIG. 1.

What has been described is a very simple method and circuit for checking integrated circuit chips. The method has the advantage that no additional part numbers need be manufactured. Since the additional checking circuitry is minimal, the added cost to manufacture the chip is small. Furthermore, the circuit has the advantage that only one or two additional pins are used to achieve the function. Testing is made easier by a customer because no special equipment is required.

It should be understood that the chips need not be absolutely identical. For example, only functionally similar portions of nonidentical chips could be checked by practicing the techniques of the present invention.

It should also be understood that the error outputs from each chip need not be tied together, in parallel, in order to practice the invention. Furthermore, while no external logic for monitoring the error outputs is needed to practice the invention, it will be readily understood by those skilled in the art that such external logic can be used to monitor the error outputs and respond to errors detected by the on-chip error detection logic.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. The method of checking integrated circuit chips having data processing logic and error-checking circuitry on each chip, each chip having off-chip outputs connected in parallel with the off-chip outputs of one or more other chips, comprising:
   inputting data from substantially identical sources to the data processing logic on each chip;
   outputting data from said logic on each chip to its error-checking circuit and to its off-chip output;
   inhibiting the off-chip output of one of said chips so that said data does not reach said off-chip output; and
   connecting said off-chip output of each chip to its own error-checking circuit, so that data generated internally on said one chip may be checked with respect to data generated externally from the other chip.

2. In an integrated circuit chip the method of inputting data from on-chip logic and off-chip logic to an on-chip checking circuit and selectively outputting said data from said chip, comprising the steps of:

passing on-chip logic output data directly to an input of said checking circuit; and passing on-chip logic output data through a multistate means capable of being in a high-impedance state or a low-impedance state, selectively, to another input of said checking circuit and to an off-chip output;

whereby when said multistate means is in a high impedance state, data from said logic is prevented from reaching said off-chip output thereby permitting off-chip data to be placed at said off-chip output and checked with respect to said on-chip logic output at said checking circuit.

3. The method in accordance with claim 2 wherein one of two chips is utilized to check the operation of the other, comprising the additional steps of:

wiring the off-chip data inputs of said chips together;

wiring the off-chip outputs of said chips together;

placing the multistate means on one of said chips in its high-impedance state; and, placing the multistate means on the other of said chips in its low-impedance state;

whereby said one chip having its multistate means in a high-impedance state checks the operation of said other of said chips by comparing data received on the off-chip output of said one chip with respect to data from the on-chip logic of said one chip.

4. An integrated circuit chip comprising:

a logic circuit having at least one output;

an error check logic having first and second inputs for checking signals on said inputs;

first means for connecting the output of said logic circuit to the first input of said error check logic;

gating means capable of being in a first state and a second state for inhibiting, when in said first state and not inhibiting, when in said second state, signals from passing therethrough from an input to an output thereof;

second means for connecting the output of said logic circuit to the input of said gating means;

an off-chip data output; and third means for connecting the output of said gating means to said second input of said error check logic and to said off chip data output.

5. The combination in accordance with claim 4 wherein said gate means further includes a gate input to which said gating means responds to place itself in either said first or said second state;

an off-chip check input; and fourth means for connecting said gate input to said off-chip check input.

6. The combination in accordance with claim 4 wherein said error-check logic further includes an error output which carries signals indicative of whether signals on said error-check logic inputs are in agreement;

an off-chip error output; and fifth means for connecting said error output to said off-chip error output.

7. The combination in accordance with claim 4 wherein said logic circuit further includes a logic data input to which said logic circuit responds to generate a logic output;

an off-chip data input; and sixth means for connecting said logic data input to said off-chip data input.

8. The combination in accordance with claim 4 wherein said gating means is a three-state driver.

9. The combination in accordance with claim 4 wherein said error check logic is a comparator.

10. The combination in accordance with claim 4 wherein said gating means is an open-collector-type driver, with passive pull-up.

* * * * *